2,795,528

THERAPEUTIC COMPOSITION CONTAINING A TETRACYCLINE AND A PHOSPHATE OTHER THAN ORTHOPHOSPHATE

Frank H. Buckwalter, De Witt, and Murray A. Kaplan and Alphonse P. Granatek, Syracuse, N. Y.

No Drawing. Application October 24, 1956, Serial No. 617,921

15 Claims. (Cl. 167—55)

This invention relates to a formulation of the antibiotic tetracycline which produces unusually high blood levels upon oral administration and, more specifically, to a mixture of an acidic salt of tetracycline and a source of phosphate anions other than orthophosphates.

Much unsuccessful work has been done in an attempt to increase the speed and efficiency of absorption of antibiotics on both oral and parenteral administration. Very little is known by way of general principles and, indeed, in the case of oral administration, it may be said that there are no methods known at all for increasing speed or efficiency of absorption other than the use of highly water-soluble salts, e. g. potassium penicillin. It is the object of the present invention to so formulate the antibiotic tetracycline that upon oral administration there will be produced immediate absorption into the blood stream of amounts of this antibiotic which are substantially greater than those obtained by the use of such present formulations as capsules, aqueous suspensions, aqueous solutions, etc. of tetracycline hydrochloride, tetracycline base or calcium tetracycline.

The object of the present invention has been achieved by providing a mixture of an acidic salt of tetracycline and a source of phosphate anions other than orthophosphates. As might be expected, various salts do not always provide precisely the same increase in the blood levels upon administration.

As used herein, the phrase "a form of tetracycline" includes organic and inorganic acid addition salts, the hydrated or anhydrous amphoteric form, metal salts, chelates, complexes and simple esters which are rapidly hydrolyzed in the body.

With respect to the tetracycline antibiotic, use may be made of any acidic tetracycline salt or the physiological equivalent thereof. The preferred tetracycline salts are tetracycline hydrochloride and the tetracycline sodium hexametaphosphate complex described below. Other salts which are effective but not to the extent of the preferred embodiments include normal organic and inorganic acid addition salts such as are used in therapy in general, i. e. bromide, sulfate, nitrate, orthophosphate, acetate, tartrate, citrate and the like. By the term "physiological equivalent" is meant tetracycline base or calcium tetracycline when used orally in such form that it is converted in situ in the stomach to the hydrochloride. Such salts are not physiologically equivalent when administered parenterally because they are not then exposed to concentrated hydrochloric acid and thus are not converted to the hydrochloride. Use may also be made in the present invention of other physiologically active tetracycline products such as rapidly hydrolyzed esters, chelates and complexes.

With regard to the source of the phosphate anions other than orthophosphates which have been found to accelerate the absorption and utilization of the tetracycline antibiotic, it is again found that some are far more effective than others and that the utility of a given anion will vary with the route of administration. As exemplified below, the preferred embodiment relies on the use in combinaton with the acid addition salt of tetracycline of a weight of a hexametaphosphate, e. g. sodium hexametaphosphate, calcium hexametaphosphate and mixtures thereof, which is in the range of 0.2 to 2.0 times the weight of the tetracycline salt.

While the preferred embodiment gives the greatest improvement in the blood level picture, some useful improvement is obtained by the use of other phosphate anions such as metaphosphate, tripolyphosphate, tetrametaphosphate, trimetaphosphate, polymetaphosphate, pyrophosphate or any of the other available phosphates other than orthophosphates. Thus, the phosphate compounds which are employed in this invention to provide a source of phosphate anions inherently have, when in the form of the sodium salt thereof, an $Na_2O:P_2O_5$ ratio of from 1.0 to 2.0, inclusive, as is evident from page 404 of volume X of the Encyclopedia of Chemical Technology, published in 1953, by the Interscience Encyclopedia, Inc. These must, of course, be supplied in combination with a cation and use is made of any non-toxic cation. Naturally, the most satisfactory compounds and the most readily available are the sodium and calcium salts of these phosphates. Use is thus made of sodium metaphosphate, sodium tripolyphosphate, and mixtures thereof in amounts equal to one-fifth to twice the weight of tetracycline antibiotic in each dosage unit. Soluble salts are preferred but not essential for the parenteral products. When desired, these products may be prepared in situ or altered by the adjustment of the pH of an aqueous solution or suspension by the addition of a base such as sodium hydroxide or ammonium hydroxide or of an acid such as hydrochloric acid, sulfuric acid, ascorbic acid or citric acid.

The preferred acid tetracycline salt is either tetracycline hydrochloride or tetracycline sodium hexametaphosphate complex. This latter complex is prepared by mixing aqueous, acid solutions of tetracycline, e. g. tetracycline hydrochloride, and sodium hexamethaphosphate and collecting by filtration under acid conditions the precipitated crystalline salt. The ratio by weight of tetracycline hydrochloride to sodium hexmetaphosphate to be used can vary widely; ratio of 1:2 to 1:0.05 are effective and about 1:0.25 or 1:0.33 is preferred. The acidity must be sufficient to maintain the tetracycline reagent in solution, e. g. less than about pH 2.0. The insolubility of the product makes the concentration used of little importance; reasonably concentrated solutions are, of course, more practical.

Eighty grams of sodium hexametaphosphate (Calgon) was dissolved in about 1600 ml. water and the pH was adjusted to 1.5 with hydrochloric acid; this solution was then added with stirring to a solution of 240 g. tetracycline hydrochloride in 2.4 liters water (100 mgm./ml.). After some tetracycline sodium hexametaphosphate complex formed as a gum, the solution was decanted and seeded to produce crystalline tetracycline sodium hexametaphosphate complex (178 g.) after stirring two hours, collecting by filtration and washing thoroughly with water and then methanol. An additional 21 g. crystalline product was obtained from the gum by stirring it in water with seed crystals. The product gave the following analyses after correction for the presence of 8.4% water (Karl Fischer): Tetracycline hydrochloride equivalents in mcg./mgm.: 763 (bio-assay); 815 (ultraviolet assay); sodium, 1.0%, phosphorus, 6.1%. The presence of one, or perhaps two, molecules of water of hydration was indicated by the value of 7.3% moisture found by the vacuum oven technique.

Theory for [5 tetracycline·$NaPO_3$·$5HPO_3$] is potency 880, 0.85% sodium and 6.8% phosphorus.

Tetracycline sodium hexametaphosphate complex contains on an anhydrous basis the elements carbon, hydrogen, nitrogen, oxygen, sodium and phosphorus in a ratio substantially in accord with the empirical formula $5C_{22}H_{24}N_2O_8 \cdot NaPO_3 \cdot 5HPO_3$, and may also be described as therapeutically active, stable, non-toxic tetracycline sodium hexametaphosphate complex characterized in purified form on an anhydrous basis by the presence of 0.7 to 1.1% sodium, 5.8 to 7.8% phosphorus, a potency in the range of 760 to 940 micrograms of tetracycline hydrochloride equivalents per milligram by bio-assay, and a solubility of water at room temperature of about 3.2 mgm./ml.

The preferred source of phosphate anions other than orthophosphates is one of the commercially available hexametaphosphates, e. g. sodium hexametaphosphate, calcium hexametaphosphate or mixtures thereof. When administered orally as in the form of capsules nothing else need be added although use may be made, if desired, of additional filling agents, lubricating agents and the like. In the case of aqueous suspensions for oral use, there may be added customary ingredients such as suspending agents, sweetening agents, preservatives, flavors and colors. For parenteral products most of these ingredients are normally omitted but there may be added the agents previously used in parenteral tetracycline products such as ascorbic acid, sources of metal ions such as magnesium chloride, and local anesthetics such as procaine hydrochloride and Xylocaine hydrochloride (α-diethylamino-2,6-aceto-xylidide hydrochloride).

The combinations of the present invention can be used for oral application in powdered form, as tablets or in capsules, but may also be used in suspensions in aqueous liquids or in anhydrous, edible oils, such as peanut oil, sesame oil, or a modified coconut oil with a setting point below 60° F. or in aqueous emulsions of such oils. Parenteral use may be made of certain of these products which, upon reconstitution with wave, give solutions at least temporarily.

When desired for specific purposes and rendered pharmaceutically compatible, there may be admixed with the combinations of the present invention various other additional medicaments, such as antihistamines, sulfa drugs (e. g. sulfadiazine, sulfabenzamide, sulfacetamide, sulfanilamide, sulfapyridine, sulfathiazole, sulfapyrazine, sulfaguanidine, sulfathalidine, sulfasuxidine, sulfisoxazole, sulfamylon, phthalylsulfacetamide, N'-3,4-dimethylbenzoylsulfanilamide, benzylsulfanilamide and N'-2-(2-quinoxalyl)-sulfanilamide), lipotropic agents (particularly methionine, choline, inositol and beta-sitosterol and mixtures thereof), stimulants of the central nervous system (e. g. caffeine, amphetamines), local anesthetics, analgesics (e. g. aspirin, salicylamide, sodium gentisate, p-acetylaminophenol, phenacetin, codeine), laxatives (e. g. phenolphthalein), sedatives (e. g. barbiturates, bromides), salts of penicillin (e. g. potassium penicillin G, procaine penicillin G, 1-ephenamine penicillin G, dibenzylamine penicillin G, and salts disclosed by U. S. Patent 2,627,491; these combinations are particularly useful to enable variations of the pattern of blood levels obtained), phenoxymethylpenicillin and salts thereof, other antibiotic agents (e. g. streptomycin, dihydrostreptomycin, bacitracin, polymyxin, tyrothricin, erythromycin, Aureomycin, Terramycin, oleandomycin, chloramphenicol, magnamycin, novobiocin, cycloserine; in some cases such combinations attack a wider range of organisms or show synergistic efficacy or provide decreased toxicity with equal efficacy), vitamins (e. g. vitamins A, $A_1$, $B_1$, $B_2$, $B_6$, $B_{12}$ and members of that family, folic acid and members of that family, vitamins C, $D_2$, $D_3$ and E), hormones (e. g. cortisone, hydrocortisone, 9α-fluorocortisone, 9α-fluorohydrocortisone, prednisone and prednisolone), anabolic agents (e. g. 11,17-dihydroxy-9α-fluoro-17α-methyl-4-androsten-3-one; 17-α-ethyl-19-nortestosterone) and antifungal agents (e. g. mycostatin).

A more comprehensive understanding of this invention is obtained by reference to the following examples, which are illustrative only and are not the exclusive embodiment of the invention.

Example I

A mixture of equal parts by weight of tetracycline hydrochloride and sodium hexametaphosphate (Calgon) was prepared, filled into capsules and administered orally in single dosage to dogs to provide a dose of 12.5 milligrams tetracycline hydrochloride per kilogram. Determination of the blood levels at various times after the administration of this single dose gave the following results:

| Dog | Blood Levels in mcg./ml., Hours after Administration | | | |
|---|---|---|---|---|
| | 0 | 1 | 4 | 24 |
| 365 | NR | 6.25 | 3.71 | .26 |
| 380 | NR | 2.00 | 1.37 | NR |
| 385 | NR | NR | .66 | NR |
| 412 | NR | NR | .67 | NR |
| | | 2.06 | 1.60 | .065 |

NR indicates no reading, i. e., no activity.

Administration of 12.5 mg. tetracycline hydrochloride per kilogram without the added sodium hexametaphosphate to nine dogs gave average blood levels in mcg./ml. of 0.77–0.92 after one hour and about 0.75 after four hours. It is apparent that this composition, which is the preferred embodiment of the present invention, gave results far superior to those obtained with the ordinary tetracycline hydrochloride capsules.

Example II

Various aqueous parenteral formulations of tetracycline hydrochloride were administered intramuscularly to groups of five rabbits in single doses of 2.5 mgm. of tetracycline hydrochloride/kg.; the blood levels obtained were about 1.37 mcg./ml. one hour after administration or about 0.85 mcg./ml. four hours after administration even when additional agents such as ascorbic acid, magnesium chloride and/or Xylocaine hydrochloride were included in the formulation. Similar or even lower levels were obtained when the tetracycline hydrochloride was replaced by calcium tetracycline, tetracycline orthophosphate, tetracycline tripolyphosphate and tetracycline pyrophosphate.

A formulation containing per cc. 50 mgms. tetracycline hydrochloride, 150 mgms. ascorbic acid and 25 mgms. sodium hexametaphosphate when administered in the same manner and dosage, gave blood levels of tetracycline of 1.72 mcg./ml. one hour after administration and 0.85 mcg./ml. four hours after administration.

Blood levels of 1.27 and 1.12 mcg./ml. one and four hours after administration, respectively were obtained in the same manner by use of a formulation containing in each cc. 50 mgms. tetracycline hydrochloride, 150 mgms. ascorbic acid, 12 mgms. magnesium chloride and 25 mgms. sodium hexametaphosphate, All of the above formulations were solutions when prepared and were administered as true solutions.

It was thus observed that the parenteral tetracycline product of commerce upon injection in rabbits gave blood levels which were substantially the same as those found for similar products containing added sodium hexametaphosphate.

Example III

Formulations are prepared after the manner of those in Example II which include sodium hexametaphosphate except that the tetracycline hydrochloride is replaced by a biologically equivalent weight of tetracycline sodium hexametaphosphate complex. These formulations are suspensions which give high blood levels.

Example IV

Capsules are filled with a mixture providing, per capsule, 125 mgms. tetracycline hydrochloride and 250 mgms. sodium hexametaphosphate.

Example V

Capsules are filled with a mixture providing, per capsule, 250 mgms. tetracyline hydrocloride and 50 mgms. sodium hexametaphosphate.

Example VI

Three dry mixtures suitable for oral use upon reconstitution with water (q. s. ad 100 cc.) are prepared by mixing 0.375 g. potassium alginate (Kelmar), 40 g. granulated sugar, 0.080 g. 200 mesh U. S. P. methyl Paraben, 0.020 g. 200 mesh U. S. P. propyl Paraben, 0.14 g. reagent grade sodium bisulfite, 0.20 g. U. S. P. sodium citrate, 0.067 g. 200 mesh U. S. P. sodium saccharin, 0.167 g. 200 mesh sodium Sucaryl, 2.50 g. tetracycline hydrochloride and either 0.50 g., 2.50 g. or 5.00 g. sodium hexametaphosphate.

We claim:

1. A therapeutic composition for the treatment of bacterial infection comprising substantially equal parts by weight of an acid addition salt of tetracycline and a non-toxic hexametaphosphate.

2. A therapeutic composition for the treatment of bacterial infection comprising substantially equal parts by weight of tetracycline hydrochloride and sodium hexametaphosphate.

3. A therapeutic composition for the treatment of bacterial infection comprising substantially equal parts by weight of tetracycline sodium hexametaphosphate complex and sodium hexametaphosphate.

4. A therapeutic composition for the treatment of bacterial infection comprising a form of tetracycline and a non-toxic metaphosphate, said non-toxic metaphosphate being present in an amount by weight in the range of one-fifth to twice the weight of said form of tetracycline.

5. A therapeutic composition for the treatment of bacterial infection comprising an acid addition salt of tetracycline and sodium metaphosphate, said sodium metaphosphate being present in an amount by weight in the range of one-fifth to twice the weight of said acid addition salt of tetracycline.

6. A therapeutic composition for the treatment of bacterial infection comprising a form of tetracycline and a non-toxic polyphosphate, said non-toxic polyphosphate being present in an amount by weight in the range of one-fifth to twice the weight of said form of tetracycline.

7. A therapeutic composition for the treatment of bacterial infection comprising an acid addition salt of tetracycline and sodium polyphosphate, said sodium polyphosphate being present in an amount by weight in the range of one-fifth to twice the weight of said acid addition salt of tetracycline.

8. A therapeutic composition for the treatment of bacterial infection comprising in admixture a form of tetracycline and a non-toxic phosphate compound, said phosphate compound having when in the form of its sodium salt an $Na_2O:P_2O_5$ ratio from 1.0 to 2.0 inclusive, and said non-toxic phosphate compound being present in an amount by weight equal to at least one-fifth the weight of said form of tetracycline.

9. A therapeutic composition for the treatment of bacterial infection comprising a form of tetracycline and a non-toxic phosphate compound, said phosphate compound having when in the form of its sodium salt an $Na_2O:P_2O_5$ ratio from 1.0 to 2.0 inclusive, and said phosphate compound being present in an amount by weight in the range of one-fifth to twice the weight of said form of tetracycline.

10. A therapeutic composition for the treatment of bacterial infection comprising an acid addition salt of tetracycline and a non-toxic phosphate compound, said phosphate compound having when in the form of its sodium salt an $Na_2O:P_2O_5$ ratio from 1.0 to 2.0 inclusive, and said phosphate compound being present in an amount by weight in the range of one-fifth to twice the weight of said acid addition salt of tetracycline.

11. A therapeutic composition for the treatment of bacterial infection comprising amphoteric tetracycline and a non-toxic phosphate compound, said phosphate compound having when in the form of its sodium salt an $Na_2O:P_2O_5$ ratio from 1.0 to 2.0 inclusive, and said phosphate compound being present in an amount by weight in the range of one-fifth to twice the weight of said amphoteric tetracycline.

12. A therapeutic composition for the treatment of bacterial infection comprising a form of tetracycline and a non-toxic hexametaphosphate, said non-toxic hexametaphosphate being present in an amount by weight in the range of one-fifth to twice the weight of said form of tetracycline.

13. A therapeutic composition for the treatment of bacterial infection comprising a form of tetracycline and sodium hexametaphosphate, said sodium hexametaphosphate being present in an amount by weight in the range of one-fifth to twice the weight of said form of tetracycline.

14. A therapeutic composition for the treatment of bacterial infection comprising an acid addition salt of tetracycline and sodium hexametaphosphate, said sodium hexametaphosphate being present in an amount by weight in the range of one-fifth to twice the weight of said acid addition salt of tetracycline.

15. A therapeutic composition for treatment of bacterial infection comprising a form of tetracycline and a non-toxic hexametaphosphate, said non-toxic hexametaphosphate and said form of tetracycline being present in substantially equal parts by weight.

References Cited in the file of this patent

UNITED STATES PATENTS

| | | |
|---|---|---|
| 2,086,867 | Hall | July 13, 1937 |
| 2,656,347 | Goett | Oct. 20, 1953 |

FOREIGN PATENTS

| | | |
|---|---|---|
| 714,085 | Great Britain | Aug. 25, 1954 |
| 7/1954 | Trinidad | Mar. 26, 1954 |

OTHER REFERENCES

Ruigh: "Stabilization of Terramycin," J. Am. Chem. Soc., August 1951, pp. 4057, 4058.

Smith: "Some Aspects of Penicillin Stability," Pharm. J., 103, 71 (1946), thru Am. J. Pharm., September 1946, p. 328.

Gray: "The Enhancement of Chlortetracycline Absorption by Citric Acid," J. of Pharmacology and Experimental Therapeutics, 1954, pp. 327–333.

Brody: "Magnesium and the Effect of the Tetracycline Antibiotics on Oxidative Processes in Mitochondria," Antibiotics and Chemotherapy, August 1954, pp. 864–870.

Minieri: Antibiotics Annual, 1953–1954, pp. 82 and 83.